US008169478B2

(12) United States Patent
Nadabar et al.

(10) Patent No.: US 8,169,478 B2
(45) Date of Patent: May 1, 2012

(54) METHOD AND APPARATUS FOR CALIBRATING A MARK VERIFIER

(75) Inventors: Sateesha Nadabar, Framingham, MA (US); Venkat K. Gopalakrishnan, Arlington, MA (US)

(73) Assignee: Cognex Corporation, Natick, MA (US)

( * ) Notice: Subject to any disclaimer, the term of this patent is extended or adjusted under 35 U.S.C. 154(b) by 1388 days.

(21) Appl. No.: 11/639,384

(22) Filed: Dec. 14, 2006

(65) Prior Publication Data

US 2008/0143838 A1 Jun. 19, 2008

(51) Int. Cl.
G06F 13/00 (2006.01)

(52) U.S. Cl. ............................... 348/92; 702/85; 709/250

(58) Field of Classification Search .................. 709/250; 702/85; 713/1; 348/92
See application file for complete search history.

(56) References Cited

U.S. PATENT DOCUMENTS

| 3,868,634 | A | 2/1975 | Dolch |
|---|---|---|---|
| 3,890,597 | A | 6/1975 | Hanchett |
| 4,282,425 | A | 8/1981 | Chadima et al. |
| 4,308,455 | A | 12/1981 | Bullis et al. |
| 4,421,978 | A | 12/1983 | Laurer et al. |
| 4,782,220 | A | 11/1988 | Shuren |
| 4,866,784 | A | 9/1989 | Barski |
| 4,894,523 | A | 1/1990 | Chadima et al. |
| 4,948,955 | A | 8/1990 | Lee et al. |
| 4,973,829 | A | 11/1990 | Ishida et al. |
| 5,028,772 | A | 7/1991 | Lapinski et al. |
| 5,120,940 | A | 6/1992 | Willsie |
| 5,124,537 | A | 6/1992 | Chandler et al. |
| 5,124,538 | A | 6/1992 | Lapinski et al. |
| 5,155,343 | A | 10/1992 | Chandler |
| 5,163,104 | A | 11/1992 | Ghosh et al. |
| 5,166,830 | A | 11/1992 | Ishida et al. |
| 5,187,355 | A | 2/1993 | Chadima et al. |
| 5,187,356 | A | 2/1993 | Chadima et al. |
| 5,192,856 | A | 3/1993 | Schaham et al. |
| 5,262,623 | A | 11/1993 | Batterman et al. |
| 5,262,625 | A | 11/1993 | Tom et al. |
| 5,262,626 | A | 11/1993 | Goren et al. |
| 5,276,315 | A | 1/1994 | Surka |

(Continued)

FOREIGN PATENT DOCUMENTS

DE 10012715 9/2000

(Continued)

OTHER PUBLICATIONS http://www.merriam-webster.com/dictionary/optimal, pp. 1, (Oct. 27, 2008).

(Continued)

Primary Examiner — Viet Vu
(74) Attorney, Agent, or Firm — Michael A. Jaskolski

(57) ABSTRACT

A method for calibrating a mark quality verifier assembly wherein the assembly includes a camera including a camera field of view (FOV) and a processor for running software programs that are stored in a memory that is accessible to the processor, the method comprising the steps of providing a calibration program in the memory that is accessible by the processor, providing a calibration code on a surface of a calibration tool wherein the calibration code includes calibration information, positioning the calibration tool adjacent the camera so that the calibration code is within the FOV, obtaining at least one image of the calibration code via the camera, using information in the calibration code to determine that a verifier calibration process should be performed and commencing the calibration program when the calibration code indicates that a calibration process should be performed.

29 Claims, 8 Drawing Sheets

U.S. PATENT DOCUMENTS

| | | | |
|---|---|---|---|
| 5,276,316 A | 1/1994 | Blanford |
| 5,278,397 A | 1/1994 | Barkan et al. |
| 5,286,960 A | 2/1994 | Longacre et al. |
| 5,291,008 A | 3/1994 | Havens et al. |
| 5,296,690 A | 3/1994 | Chandler et al. |
| 5,304,786 A | 4/1994 | Pavlidis et al. |
| 5,332,892 A | 7/1994 | Li et al. |
| 5,378,883 A | 1/1995 | Batterman et al. |
| 5,412,197 A | 5/1995 | Smith |
| 5,418,862 A | 5/1995 | Zheng et al. |
| 5,420,409 A | 5/1995 | Longacre et al. |
| 5,446,271 A | 8/1995 | Cherry et al. |
| 5,455,414 A | 10/1995 | Wang |
| 5,461,417 A | 10/1995 | White et al. |
| 5,463,214 A | 10/1995 | Longacre et al. |
| 5,478,999 A | 12/1995 | Figarella et al. |
| 5,481,098 A | 1/1996 | Davis et al. |
| 5,486,689 A | 1/1996 | Ackley |
| 5,487,115 A | 1/1996 | Surka |
| 5,507,527 A | 4/1996 | Tomioka et al. |
| 5,514,858 A | 5/1996 | Ackley |
| 5,523,552 A | 6/1996 | Shellhammer et al. |
| 5,539,191 A | 7/1996 | Ackley |
| 5,550,366 A | 8/1996 | Roustaei |
| 5,557,091 A | 9/1996 | Krummel |
| 5,591,956 A | 1/1997 | Longacre et al. |
| 5,612,524 A | 3/1997 | San't Anselmo et al. |
| 5,635,699 A | 6/1997 | Cherry et al. |
| 5,646,391 A | 7/1997 | Forbes et al. |
| 5,657,402 A | 8/1997 | Bender et al. |
| 5,675,137 A | 10/1997 | van Haagen et al. |
| 5,682,030 A | 10/1997 | Kubon |
| 5,691,597 A | 11/1997 | Nishimura et al. |
| 5,723,853 A | 3/1998 | Longacre et al. |
| 5,739,518 A | 4/1998 | Wang |
| 5,742,037 A | 4/1998 | Scola et al. |
| 5,744,790 A | 4/1998 | Li |
| 5,756,981 A | 5/1998 | Roustaei et al. |
| 5,767,497 A | 6/1998 | Lei |
| 5,767,498 A | 6/1998 | Heske et al. |
| 5,777,309 A | 7/1998 | Maltsev et al. |
| 5,786,586 A | 7/1998 | Pidhirny et al. |
| 5,814,827 A | 9/1998 | Katz |
| 5,821,520 A | 10/1998 | Mulla et al. |
| 5,825,006 A | 10/1998 | Longacre et al. |
| 5,852,288 A | 12/1998 | Nakazawa et al. |
| 5,872,354 A | 2/1999 | Hanson |
| 5,877,486 A | 3/1999 | Maltsev et al. |
| 5,880,451 A | 3/1999 | Smith et al. |
| 5,889,270 A | 3/1999 | van Haagen et al. |
| 5,902,988 A | 5/1999 | Durbin |
| 5,914,476 A | 6/1999 | Gerst et al. |
| 5,920,060 A | 7/1999 | Marom |
| 5,929,418 A | 7/1999 | Ehrhart et al. |
| 5,932,862 A | 8/1999 | Hussey et al. |
| 5,936,224 A | 8/1999 | Shimizu et al. |
| 5,949,052 A | 9/1999 | Longacre et al. |
| 6,000,612 A | 12/1999 | Xu |
| 6,006,990 A | 12/1999 | Ye et al. |
| 6,021,946 A | 2/2000 | Hippenmeyer et al. |
| 6,053,407 A | 4/2000 | Wang et al. |
| 6,056,198 A | 5/2000 | Rudeen et al. |
| 6,075,883 A | 6/2000 | Stern et al. |
| 6,075,905 A | 6/2000 | Herman et al. |
| 6,078,251 A | 6/2000 | Landt et al. |
| 6,082,619 A | 7/2000 | Ma et al. |
| 6,088,482 A | 7/2000 | He et al. |
| 6,095,422 A | 8/2000 | Ogami |
| 6,123,261 A | 9/2000 | Roustaei |
| 6,152,371 A | 11/2000 | Schwartz et al. |
| 6,158,661 A | 12/2000 | Chadima et al. |
| 6,161,760 A | 12/2000 | Marrs |
| 6,176,428 B1 | 1/2001 | Joseph et al. |
| 6,189,792 B1 | 2/2001 | Heske |
| 6,206,289 B1 | 3/2001 | Sharpe et al. |
| 6,209,789 B1 | 4/2001 | Amundsen et al. |
| 6,234,395 B1 | 5/2001 | Chadima et al. |
| 6,234,397 B1 | 5/2001 | He et al. |
| 6,250,551 B1 | 6/2001 | He et al. |
| 6,289,113 B1 | 9/2001 | McHugh et al. |
| 6,298,176 B2 | 10/2001 | Longacre et al. |
| 6,340,119 B2 | 1/2002 | He et al. |
| 6,371,373 B1 | 4/2002 | Ma et al. |
| 6,398,113 B1 | 6/2002 | Heske |
| 6,405,925 B2 | 6/2002 | He et al. |
| 6,408,429 B1 | 6/2002 | Marrion et al. |
| 6,446,868 B1 | 9/2002 | Robertson et al. |
| 6,454,168 B1 | 9/2002 | Brandt et al. |
| 6,490,376 B1 | 12/2002 | Au et al. |
| 6,491,223 B1 | 12/2002 | Longacre et al. |
| 6,505,778 B1 | 1/2003 | Reddersen et al. |
| 6,512,714 B2 | 1/2003 | Hanzawa et al. |
| 6,513,714 B1 | 2/2003 | Davis et al. |
| 6,513,715 B2 | 2/2003 | Heske et al. |
| 6,561,427 B2 | 5/2003 | Davis et al. |
| 6,629,642 B1 | 10/2003 | Swartz et al. |
| 6,677,852 B1 | 1/2004 | Landt |
| 6,681,151 B1 | 1/2004 | Weinzimmer et al. |
| 6,698,656 B2 | 3/2004 | Parker et al. |
| 6,728,419 B1 | 4/2004 | Young |
| 6,761,316 B2 | 7/2004 | Bridgelall |
| 6,816,063 B2 | 11/2004 | Kubler |
| 6,913,199 B2 | 7/2005 | He |
| 6,919,793 B2 | 7/2005 | Heinrich |
| 7,044,378 B2 | 5/2006 | Patel et al. |
| 7,059,525 B2 | 6/2006 | Longacre et al. |
| 7,061,524 B2 | 6/2006 | Liu et al. |
| 7,066,388 B2 | 6/2006 | He |
| 7,070,099 B2 | 7/2006 | Patel |
| 7,108,184 B2 * | 9/2006 | Mase et al. ............... 235/462.01 |
| 7,121,467 B2 | 10/2006 | Winter |
| 7,175,090 B2 | 2/2007 | Nadabar |
| 7,181,066 B1 | 2/2007 | Wagman |
| 7,219,841 B2 | 5/2007 | Biss |
| 7,498,566 B2 * | 3/2009 | Kasper et al. ............. 250/252.1 |
| 7,604,174 B2 | 10/2009 | Gerst et al. |
| 7,609,846 B2 * | 10/2009 | Smith et al. .................. 382/100 |
| 7,614,554 B2 * | 11/2009 | Mott et al. .................... 235/440 |
| 2001/0042065 A1 | 11/2001 | Sasaki et al. |
| 2001/0042789 A1 | 11/2001 | Krichever et al. |
| 2002/0044689 A1 | 4/2002 | Roustaei et al. |
| 2002/0171745 A1 | 11/2002 | Ehrhart |
| 2003/0006290 A1 | 1/2003 | Hussey et al. |
| 2003/0090586 A1 | 5/2003 | Jan et al. |
| 2003/0117511 A1 | 6/2003 | Belz et al. |
| 2003/0121978 A1 | 7/2003 | Rubin et al. |
| 2004/0026508 A1 | 2/2004 | Nakajima et al. |
| 2004/0091255 A1 | 5/2004 | Chase et al. |
| 2005/0180804 A1 | 8/2005 | Andrew et al. |
| 2005/0194447 A1 | 9/2005 | He et al. |
| 2005/0263599 A1 | 12/2005 | Zhu et al. |
| 2005/0275897 A1 | 12/2005 | Fan et al. |
| 2006/0022052 A1 | 2/2006 | Patel et al. |
| 2006/0027657 A1 | 2/2006 | Nunnink et al. |
| 2006/0027661 A1 | 2/2006 | Hosoi et al. |
| 2006/0050961 A1 | 3/2006 | Thiyagarajah |
| 2006/0131418 A1 | 6/2006 | Testa |
| 2006/0132787 A1 | 6/2006 | Mestha et al. |
| 2006/0249581 A1 | 11/2006 | Smith et al. |
| 2006/0285135 A1 | 12/2006 | Mestha et al. |
| 2008/0004822 A1 | 1/2008 | Nadabar et al. |
| 2008/0011855 A1 | 1/2008 | Nadabar |
| 2008/0019615 A1 | 1/2008 | Schnee et al. |
| 2008/0143838 A1 | 6/2008 | Nadabar |
| 2009/0090781 A1 | 4/2009 | Ye et al. |
| 2009/0121027 A1 | 5/2009 | Nadabar |

FOREIGN PATENT DOCUMENTS

| | | |
|---|---|---|
| EP | 0571892 | 12/1993 |
| EP | 0896290 | 10/2004 |
| EP | 1469420 | 10/2004 |
| EP | 1975849 | 1/2008 |
| WO | WO9613797 | 5/1996 |
| WO | WO0215120 | 2/2002 |
| WO | WO02075637 | 9/2002 |

| | | |
|---|---|---|
| WO | WO2006052884 | 5/2006 |
| WO | WO2008118419 | 10/2008 |
| WO | WO2008118425 | 10/2008 |

OTHER PUBLICATIONS

International Standard, ISO/IEC 16022 First Edition May 1, 2000—Reference No. ISO/IEC 16022:2000(E), Information Technology—International Symbology Specification—Data Matrix, (May 1, 2000).

SAE Aerospace Standard AS9132, International Aerospace Quality Group (IAQG), Verification Standard, (Feb. 2002).

Automatic I.D. News, Serving users of optical, magnetic, radio frequency, voice recognition systems, an HBJ Publication, (Oct. 1986).

Cognex Corporation, Implementing Direct part Mark Identification: 10 Important Considerations, ID Products, (2004), pp. 1-12.

Rolls-Royce, Direct Part Marking, Implementation Guide, Issue 1—Vcom 9897,(Jun. 2004).

Taniguchi, R-I et al., A Distributed-Memory Multi-Thread Multiprocessor Architecture for Computer Vision and Image Processing: Optimized Version of AMP, System Sciences, Los Alamitos, CA, (1993),pp. 151-160.

Wittenburg, J.P. et al., A Multithreaded Architecture Approach to Parallel DSP's for High Performance Image Processing Applications, Signal Processing Systems, Piscataway, NJ, (1999), pp. 241-250.

US 6,768,414, 07/2004, Francis (withdrawn)

* cited by examiner

METHOD AND APPARATUS FOR CALIBRATING A MARK VERIFIER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to mark verification systems and more specifically to a method for calibrating a mark verification system wherein a verifier reader commences calibration when information in an image obtained by the verifier indicates that a calibration process should commence.

Many different industries require that marks be applied to manufactured components so that the components can be tracked during distribution, when installed or assembled, during maintenance processes, during use and after use. For instance, in the jet engine industry, jet engines include, among other components, turbines that include turbine blades that are manufactured in various size lots. Here, each turbine blade is marked when manufactured so that the blade can be tracked. Prior to the blade being disposed of, if any defect is ever detected in the blade, the defect can be traced back to a lot and a manufacturing process associated therewith so that any possible defects in other blades of the lot can be identified. Where marks are applied directly to components/parts, the marks are generally referred to as direct part marks (DPMs).

To directly mark components, known marking systems have been set up that include a marking station that applies a mark to a component. For instance, in at least some cases a marking station will apply a DataMatrix barcode symbol to each manufactured component where a DataMatrix symbol is a two-dimensional barcode that stores from 1 to about 2,000 characters. An exemplary DataMatrix symbol is typically square and can range from 0.001 inch per side up to 14 inches per side. As an example of density, 500 numeric only characters can be encoded in a 1-inch square DataMatrix symbol using a 24-pin dot matrix marking machine.

Despite attempts to apply marks that can be read consistently thereafter, sometimes mark application errors occur such that the mark cannot be subsequently consistently read and decoded properly. For instance, in some cases the surface to which the mark is applied may be somewhat discolored so that the contrast of the mark to the background of the application surface is not optimal. As another instance, in some cases where a mark consists of a plurality of dots, the dot sizes may be too large so that spaces there between are not perfectly discernible or the dot sizes may be too small to be recognized by some types of readers. As still other instances, axial non-uniformity of grid non-uniformity of the applied mark may be too great to reliably read. Many other mark metrics may be imperfect and may render mark difficult if not impossible to decode using many readers.

Whether or not a mark that has been applied to a component is readable often depends on the reading and decoding capabilities of a reader used to read and decode the mark. For instance, some relatively complex and expensive readers are capable of reading extremely distorted marks while cannot read marks that are not almost perfect.

To verify that applied marks are of sufficient quality to be read by readers at a specific facility (i.e., by the least sophisticated reader that is used at a specific facility), often marking systems will include, in addition to a marking station, a stationary verification station and at least a portion of a transfer line to transfer freshly marked components from the marking station to the verification station. Here, after a mark is applied to a component, the component is transferred via the transfer line to the verification station where the mark is precisely aligned with an ideal stationary light source and a stationary camera/mark reader that is juxtaposed such that a camera field of view is precisely aligned with the mark. After alignment, the reader reads the mark and attempts to verify code quality.

Verification can include several steps including decoding the mark and comparing the decoded information to known correct information associated with the mark that should have been applied. In addition, verification may also include detecting mark size, geometric mark characteristics (e.g., squareness of the mark), symbol contrast, quantity of applied ink, axial non-uniformity, grid non-uniformity, extreme reflectance, dot diameter, dot ovality, dot position, background uniformity, etc.

When a mark does not pass a verification process (i.e., mark quality is low), the marked component may be scrapped to ensure that the marked component does not enter distribution channels.

When a marked component passes a verification test at a manufacturing facility and is shipped to a client facility, when the component is received at a client's facility, it is often desirable for the client to independently verify that mark quality is sufficient for use with all of the readers at the facility and to decode the mark information to verify component type, to establish a record of received components, to begin a warranty period, etc. To this end, on one hand some known facilities include stationary verification systems akin to the verification stations at the component manufacturing facility described above that perform various verification processes including decoding to verify mark quality. To this end, known verification systems, like the known verification station described above, include some stationary mechanism (e.g., mechanical locking devices, sensors, etc.) for precisely aligning the mark on the component with a stationary ideal light source and a stationary camera so that the camera can generate an image of the mark and a processor can then glean mark verifying information from the mark.

On the other hand, other facilities employ hand held verifiers where a hand held mark reader is supplemented with verification hardware and software for performing verification processes.

Prior to using a verifier to verify mark quality the verifier has to be calibrated so that, when operated, optimal images are obtained for verification purposes. Known verifier calibration processes require that a verifier unit be linked to a computer (e.g., a personal computer (PC)) where the computer is used to manually set calibration target parameters (e.g., reflectance measurements, dimension measurement, etc.). After target parameters are manually set a calibration target is placed in the verifier field of view (FOV) and the PC is used to initiate a calibration operation in which a sequence of images of the calibration target are obtained using different verifier settings (e.g., exposure times). For each image, the verifier measures various characteristics of the image and compares those characteristics to the calibration target parameters. The image sequence continues with different verifier settings until the image characteristics match or are substantially similar to the target parameters after which the verifier settings or operating parameters are stored for use during subsequent verifier operations.

While verifiers can be calibrated using the known processes wherein the verifiers are linked to a computer (e.g., a PC), PC based calibration processes are burdensome as the calibration software has to be installed and set up on the PC prior to performing the calibration process and a PC has to be present to facilitate the process.

BRIEF SUMMARY OF THE INVENTION

It has been recognized that calibration parameters and a calibration start command can be stored on a calibration tool (e.g., a calibration card) and can be obtained from the calibration tool at any time by a verifier assembly to cause the verifier assembly to start a calibration process. Here, after obtaining information from a calibration tool and decoding the information, a verifier processor can be programmed to identify a calibration start command and calibration parameters automatically. Where a calibration start command is identified, the verifier can start the calibration process using the calibration parameters. In this way a verifier calibration process can be commenced without requiring additional hardware and in a particularly efficient manner.

To the accomplishment of the foregoing and related ends, the invention comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
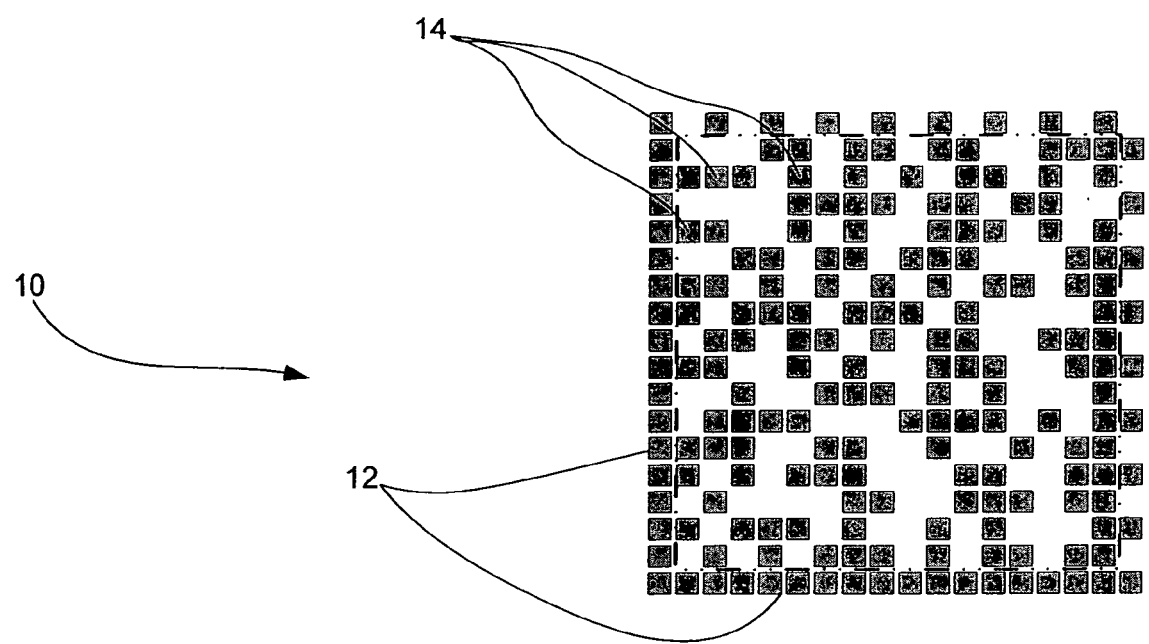
FIG. 1 is a schematic view showing an exemplary 2D calibration code or mark that includes border columns and rows, a section including data associated with a calibration start command and a section including data that specifies calibration target parameters.

Referring now to the drawings wherein like reference numerals correspond to similar elements throughout the several views and, more specifically, referring to FIG. 1, an exemplary two-dimensional (2D) verifier calibration mark is illustrated that includes 18 rows and 18 columns of binary data (e.g., each element at a specific row and column combination is either black or white corresponding to a binary 1 or binary 0). First and last columns and first and last rows in mark 10 have specific black-white patterns that are usable to distinguish the edges of the mark. To this end, as illustrated in FIG. 1, each of the first column and last row of the mark 10 as illustrated includes black cells while each of the first row and last column include alternating black and white cells that can be used by a verifier or reader as landmarks for locating the mark in an obtained image.

Hereinafter, the first and last columns and rows will collectively be refereed to as the mark border or frame. Within the space framed by the mark border, mark 10 includes cells 14 for storing data. When the data corresponding to cells 14 is read and decoded, a portion of the decoded data is used to codify a calibration start command while a second portion of the decoded data is used to codify calibration target parameters to be used by a verifier assembly to set verifier target parameters and for facilitating a verifier calibration process. For instance, where the decoded information includes 10,000 bits of information, the first 100 bits of information may include the calibration start command when the mark 10 is a calibration type mark. The verifier assembly in the present case is programmed to recognize when the decoded information specifies a calibration process and to use the calibration parameters from the decoded information to facilitate a calibration process.

Figure 2:
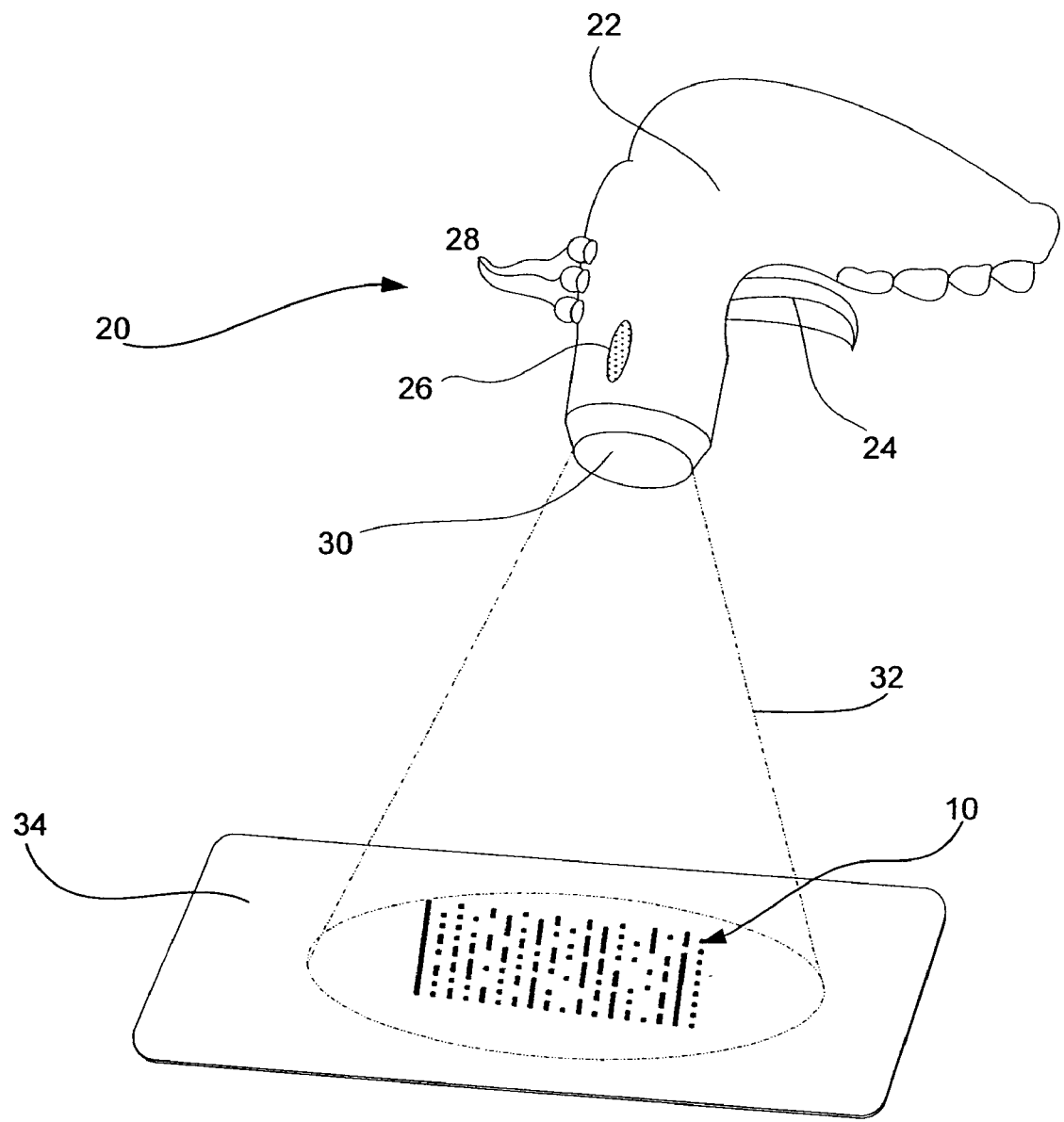
FIG. 2 is a schematic diagram illustrating a handheld verifier assembly and a calibration card where the card includes a code similar to the code illustrated in FIG. 1.
Figure 3:
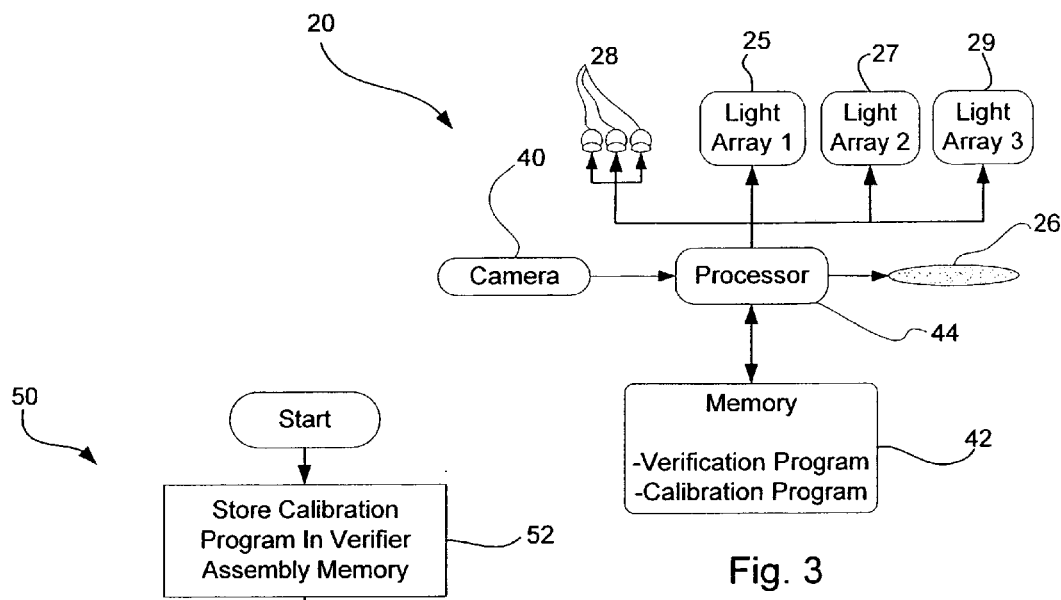
FIG. 3 is a schematic diagram illustrating various components of the verification assembly of FIG. 2.

Referring now to FIGS. 2 and 3, an exemplary handheld verifier assembly 20 is illustrated that includes, among other components, a pistol shaped housing 22, a trigger member 24, communication devices including a plurality of LEDs 28 and a small speaker 26, a camera 40, a processor 44, a memory or database 42 and first, second and third lighting assemblies or arrays 25, 27 and 29, respectively. The housing 22 is pistol shaped and includes a grip portion and a barrel portion that extends to a distal end 30 at the end of the barrel portion.

Along a top surface of the barrel a plurality of LEDs 28 are mounted which can be illuminated to indicate the status of a calibration process and/or verification process. Speaker 26 is mounted in an external surface of housing 22 for generating sounds (e.g., one or a series of beeps or buzzes) for indicating process status. Trigger 24 is mounted along the trip portion of housing 22 to facilitate ergonomic activation thereof by pressing the trigger member 24 toward the grip portion of housing 22.

Each of processor 44, camera 40, memory 42 and lighting assemblies 25, 27 and 29 are mounted within housing 22. The camera may take several different forms but, in at least some embodiments, will include a charge-coupled device (CCD) camera or a CMOS camera. The camera is mounted within housing 22 so that a lens associated therewith is directed out the distal end 30 of the housing 22 for collecting images of object/codes located within a field of view 32 (see FIG. 2).

The three lighting assemblies 25, 27, and 29 are provided for generating different light patterns or light consistent with three different types of illumination schemes to illuminate objects/marks within the field of view 32 of the camera. For instance, one light assembly 25 may generate direct light field illumination while a second assembly 27 may generate dark field illumination.

Referring to FIG. 3, memory 42 is used to store programs used by processor 44 to perform each of a calibration process and a verification process. To this end, as shown in FIG. 3, the memory 42 includes a verification program and a calibration program.

Referring still to FIG. 3, processor 44 is linked to camera 40 and to each of the lighting assemblies 25, 27 and 29 for controlling each of those components when the trigger member 24 (see again FIG. 3) is activated. Processor 44 is also linked to the output LEDs 28 and the speaker 26 to provide status feedback to a device user. In at least some embodiments, when trigger member 24 is activated, processor 44 causes camera 40 to obtain an image of the object/mark located within the field of view 32 using a currently set illumination scheme (i.e., the most recently employed of the three lighting assemblies 25, 27 or 29). When the image is obtained, processor 44 stores the raw image data in memory 42.

Referring once again to FIGS. 1 and 2, in at least some inventive embodiments, it is contemplated that a calibration mark like the mark 10 illustrated in FIG. 1 may be provided on a calibration tool such as a calibration card 34. In FIG. 2, the calibration mark 10 is provided on a single surface of card 34. Here, to commence a verifier assembly calibration process, the verifier assembly 20 can be used to obtain an image of the mark 10 on card 34, to decode the image, to examine the decoded data to recognize that the mark is a calibration mark and, when the mark is recognized as a calibration mark, to automatically facilitate a calibration process.

Where the decoded data includes a calibration start command, processor 44 examines the decoded data to identify the calibration target parameters including, for example, background surface reflectance of the card 34, code dimensions of the mark 10 on the card 34, etc. Once the calibration target parameters have been identified, processor 44 uses the target parameters to set various calibration parameters to be used during the calibration process and then performs other calibration steps to identify values for additional operating parameters to be set.

Figure 4:
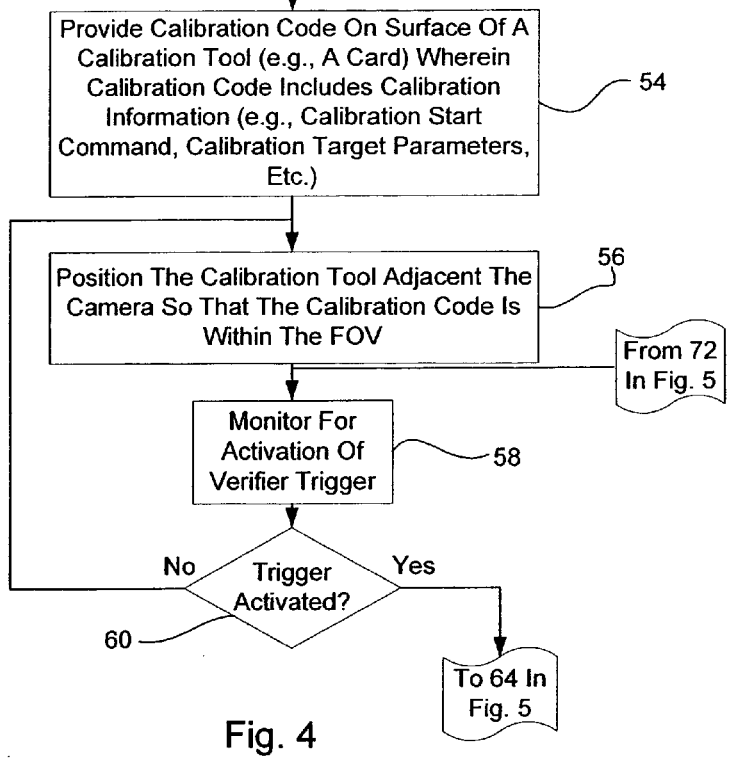
FIG. 4 is a flow chart illustrating a method or process for using the calibration assembly and calibration card of FIG. 1 to commence a calibration process.

Referring now to FIG. 4, an exemplary process 50 that may be used to calibrate a verifier assembly is shown. Referring also to FIGS. 1-3, at block 52, a calibration program is stored in the verifier assembly memory 42. At block 54, a calibration code or mark 10 is provided or applied on the surface of a calibration tool such as the calibration card illustrated in FIG. 2. Consistent with the discussion above, the calibration code or mark will include calibration information such as the calibration start command and calibration target parameters.

Continuing, at block 56, a verifier assembly user positions the calibration card adjacent the verifier assembly so that the calibration code or mark 10 is within the camera field of view. At block 58, the verifier assembly 44 monitors for activation of the verifier trigger member 24. At decision block 60, where the trigger member 245 has not been activated, control passes back up to block 56 where the loop including blocks 56, 58 and 60 is repeated. Once trigger member 24 is activated at block 60, control passes to block 64 in FIG. 5.

Figure 5:
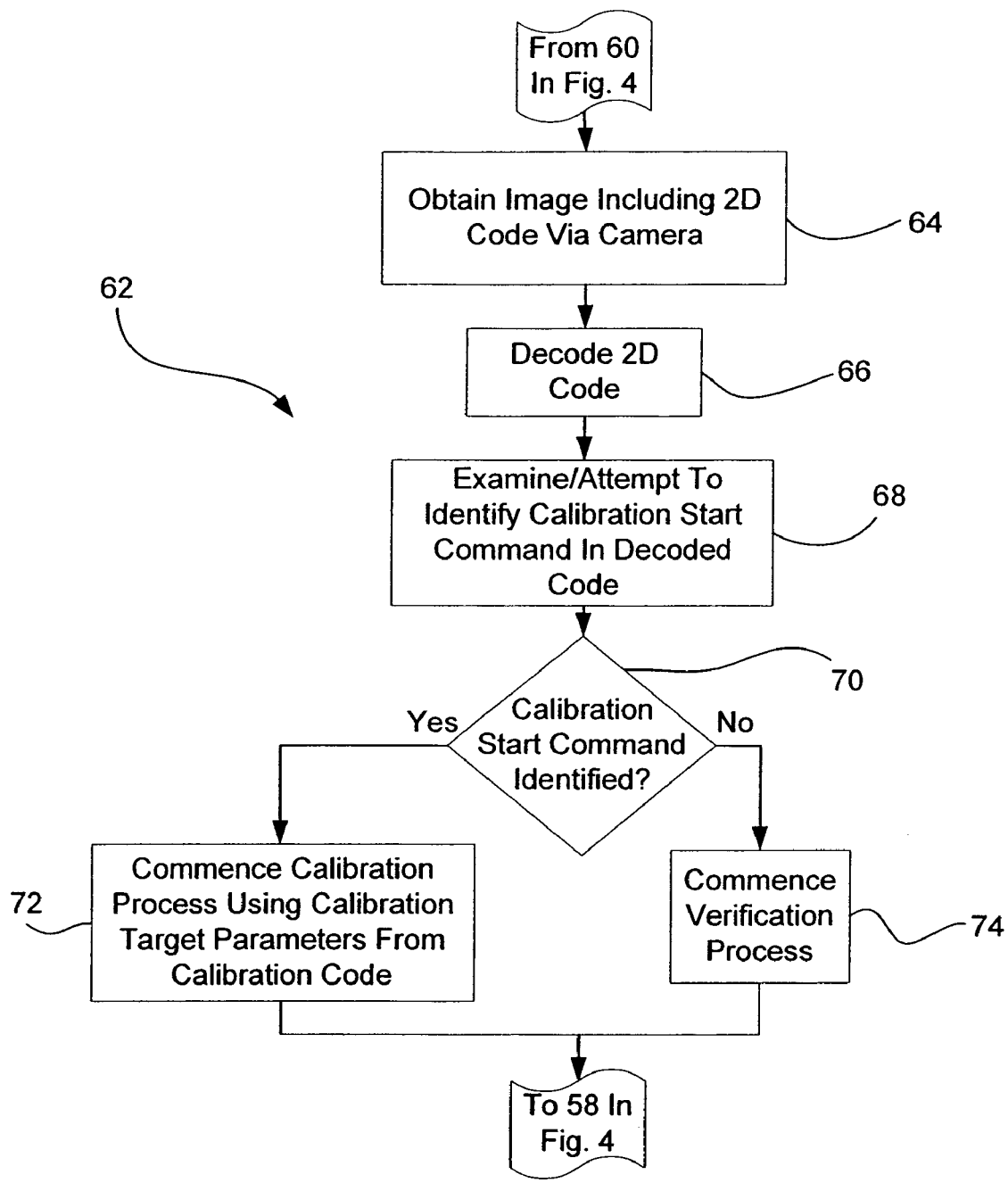
FIG. 5 is a flow chart illustrating a method or process performed by the processor of FIG. 3 after the trigger member of FIG. 2 has been activated to obtain an image of 2D code to either facilitate a calibration process or a verification process.

Referring now to FIG. 5, an exemplary method 62 that may be performed by processor 44 of verifier assembly 20 after the trigger member 24 has been activated is shown. Referring also to FIGS. 1 through 4, at block 64, after the trigger member 24 has been activated, processor 44 controls one of the light arrays 25, 27 and 29 and the camera 40 to obtain an image including a 2D mark or code. At block 66, processor 44 decodes the 2D code that is included in the obtained image. At block 68, processor 44 examines the decoded data and attempts to identify a calibration start command in the decoded data. At block 70, where a calibration start command has been identified, control passes to block 72 where processor 44 commences a calibration process. An exemplary calibration process is described below with respect to FIG. 6. After block 72, control passes back to block 58 in FIG. 4 where processor 44 again monitors for trigger activity.

Referring again to decision block 70 in FIG. 5, where processor 44 does not identify a calibration start command, control passes to block 74 where a verification process is commenced. After block 74, control passes again to block 58 in FIG. 4.

Figure 6:
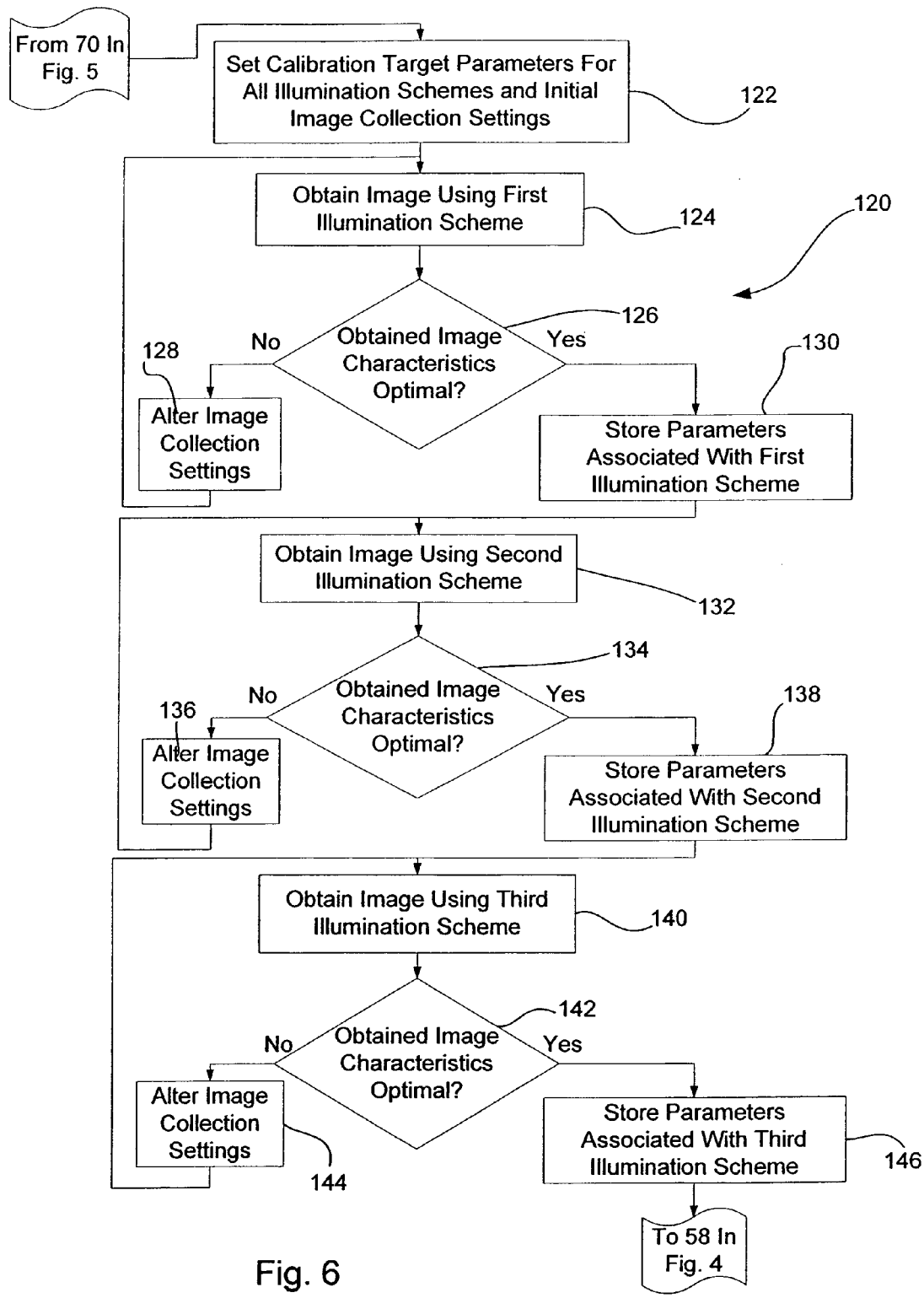
FIG. 6 is a flow chart illustrating an exemplary calibration method that may be performed as part of the calibration process of FIG. 5.

Referring now to FIG. 6, an exemplary calibration process or method 120 that may be performed by processor 44 is shown. Referring also to FIGS. 1 through 3 and FIG. 5, after the calibration start command is identified at block 70, control may pass to block 122 in FIG. 6. At block 122, processor 44 identifies the calibration target parameters specified in the calibration mark (e.g., see 10 in FIG. 1) and sets those parameters within the verifier. In addition, at block 122, processor 44 sets initial image collection settings such as exposure time.

At block 124, processor 44 controls the first lighting assembly 25 and the camera 40 to obtain an image of the calibration mark in a manner consistent with the initial image collection settings. At block 126 after the image has been obtained, processor 44 identifies various characteristics of the obtained image and compares those characteristics to the calibration target parameters associated with the illumination scheme associated with the first lighting assembly. Where the characteristics of the obtained image are different than the compared target parameters, control passes to block 128 where the image collection settings are altered. For example, where an exposure time was initially set at a relatively short duration at block 122, at block 128, the exposure time may be extended by a small incremental duration. After block 128, control passes back up to block 124 where processor 44 obtains another image of the calibration mark using the camera 40 and the first lighting assembly 25. This looping processing including blocks 124, 126 and 128 continues until the characteristics of the obtained image at block 126 are optimal. Once an optimal image has been obtained, control passes to block 130 where processor 44 stores the parameters associated with the first illumination scheme.

After block 130, control passes to block 132 where processor 44 controls the camera 40 and the second lighting assembly 27 to obtain another image of the calibration mark using initial image collection settings corresponding to the second illumination scheme. At block 134, processor 44 determines whether or not characteristics of the obtained image at block 132 are different than the calibration target parameters and, where the characteristics are different, control passes to block 136 where the image collection settings (e.g., the exposure time) are altered. After block 136, control passes back up to block 132 where processor 44 controls lighting assembly 27 and camera 40 to obtain another image using the altered image collection settings. After block 132, control again passes to block 134. Once an image is obtained at block 132 that has characteristics that are at least substantially similar to the target parameters, control passes from block 134 to block 138 where processor 44 stores the parameters associated with the second illumination scheme. After 138, control passes down to block 140.

At block 140, processor 44 controls the third lighting assembly 29 and camera 40 to obtain an image corresponding to the third illumination scheme. At block 142, processor 44 identifies the characteristics of the obtained image and compares those characteristics to the target parameters. Where the characteristics of the obtained image are different than the target parameters, control passes from block 142 down to block 144 where the image collection settings (e.g., exposure time) are altered after which control passes back up to block 140. Eventually, characteristics of an image obtained at block 140 are substantially similar to the target parameters and at that point control passes from block 142 to block 146 where parameters associated with the third illumination scheme are stored. After block 146, control passes back up to block 58 in FIG. 5.

In at least some embodiments the process described above with respect to FIGS. 4-6 is performed rapidly (e.g., with 2-3 seconds) and during a single activation of trigger member 24. Thus, to a verify user, most of the process steps described above occur automatically.

Figure 7:
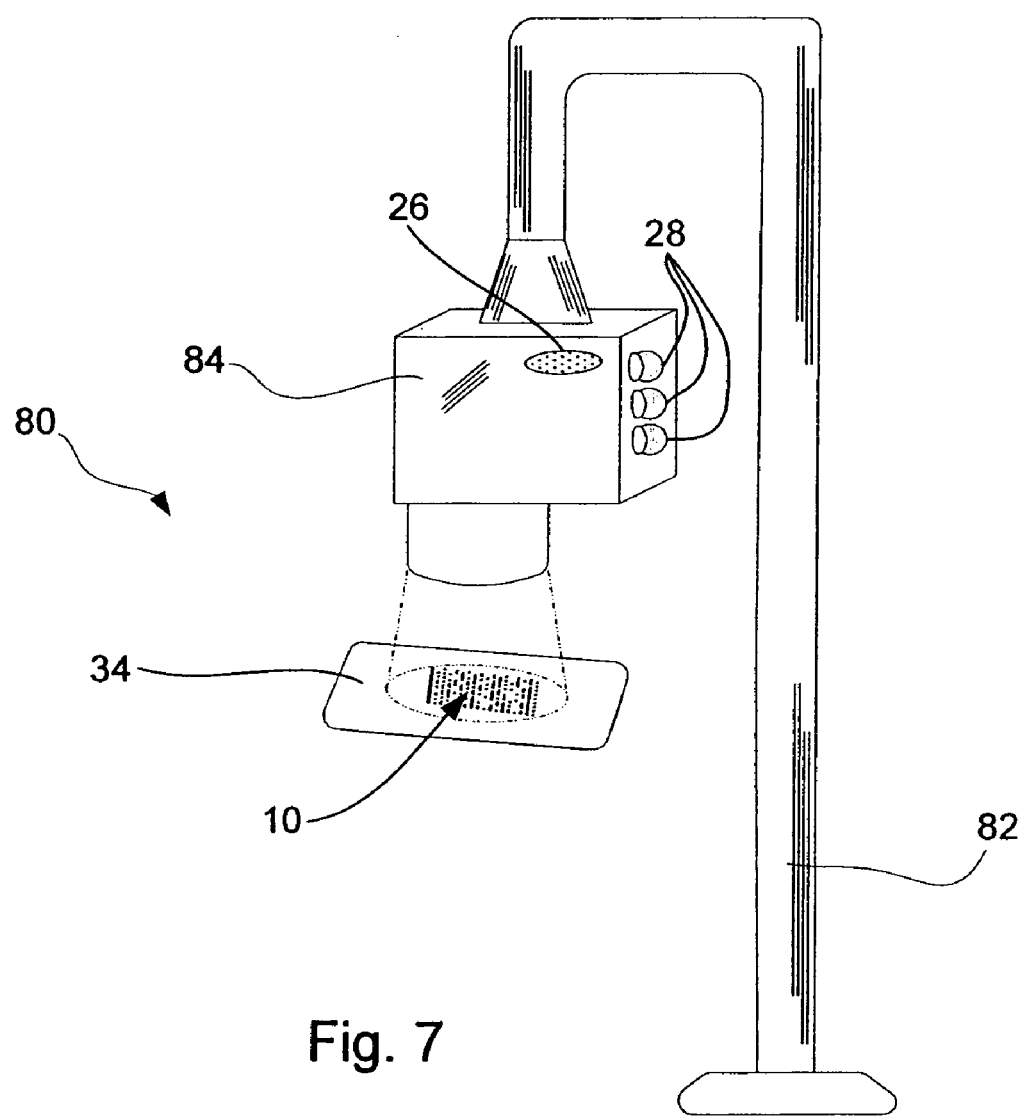
FIG. 7 is a schematic diagram illustrating a second verification assembly, albeit where the verification assembly is stationary as opposed to handheld and portable as in FIG. 2.

While the embodiment described above with respect to FIG. 2 includes a handheld verifier assembly, it should be appreciated that other stationary verifier assemblies are contemplated. For instance, referring to FIG. 7, an exemplary stationary verifier assembly 80 is shown that includes a stand 82, a housing 84, a speaker 26 and output LEDs 28 where, although not illustrated, a camera, a processor, a memory and lighting arrays would all be mounted within housing 84. Here, calibration of the verifier system 80 would be performed in a fashion similar to that described above with respect to the handheld verifier in FIG. 3 where a calibration card 34 including a calibration code or mark 10 would be positioned within a field of view corresponding to the camera and housing, an image of the mark 10 would be obtained and recognized as a calibration mark and then the information in the mark 10 would be used to commence the calibration procedure and to download or obtain calibration target parameters.

Referring once again to FIGS. 1 and 2, while the exemplary mark 10 shown codifies a calibration start command and calibration target parameters, it is contemplated that the start command and calibration target parameter may be codified in two or more separate marks. For instance, here, the verifier assembly 20 may first be used to obtain an image of a first 2D code that indicates that a calibration process should be commenced where the first mark does not include calibration target parameters. Subsequent to obtaining the image of the first mark, an image of a second 2D mark that includes calibration target parameters may be obtained. Here, it is contemplated that, after the image of the first mark is obtained, decoded and recognized as a start calibration command, the calibration program would be commenced causing the processor 44 to recognize the immediately subsequent 2D image as an image codifying calibration target parameters to be used during the remainder of the calibration process.

Figure 8:
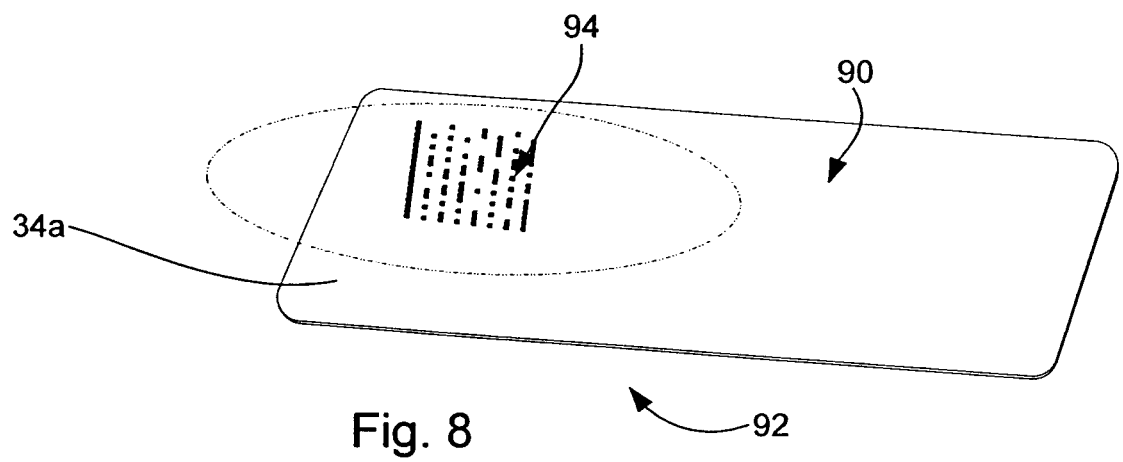
FIG. 8 is a schematic diagram illustrating another calibration card where a first 2D code is shown on a first surface of the card.
Figure 9:
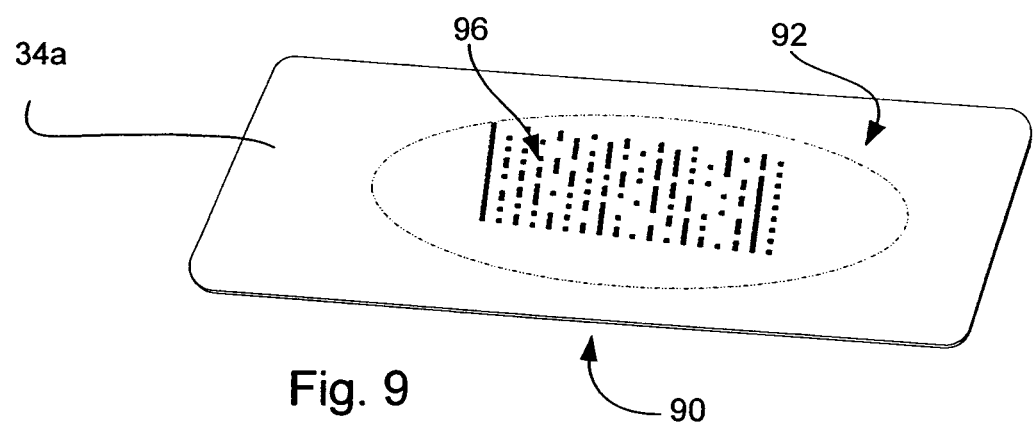
FIG. 9 is similar to FIG. 8, albeit showing a second 2D code that is provided or applied on a second surface of the calibration card.

Consistent with the comments above, FIGS. 8 and 9 show a single calibration card 34a that includes first and second oppositely facing surfaces 90 and 92, respectively, where a first 2D mark 94 is provided on first surface 90 and a second 2D mark 96 is provided on second surface 92. In this case, first mark 94 would codify a start calibration command while second mark 96 would codify the calibration target parameters. To use card 34a, an image of first mark 94 would first be obtained, decoded by processor 44 and recognized as a calibration start command which would cause the processor 44 to recognize the next 2D mark obtained as a mark codifying calibration target parameters. Continuing, the card 34a would be flipped over so that an image of the second 2D mark 96 could be obtained after which processor 44 would decode the second mark 96 and use the decoded data to identify calibration target parameters for use during the remainder of the calibration process.

While the above systems are described in the context of verification assemblies that obtain data through decoding marks that appear in 2D images, in at least some other embodiments it is contemplated that calibration information may be obtained from a calibration card or tool in other ways. For example, in at least some cases it is contemplated that a calibration assembly may, in addition to being able to obtain images of 2D codes, be able to obtain information from a card 34b via RF communication. For instance, in at least some embodiments, a card may be provided with an RF memory and transmitter device which, when activated, transmits or broadcasts calibration information including at least a subset of a calibration start command and calibration target parameters. In this case, the verifier assembly would include an RF antenna for exciting the memory/transmitter device and for receiving transmitted information therefrom. Here, in order to complete the calibration process, a calibration card or target (with or without a mark) would be required in some cases so that reflectance and other parameters can be analyzed.

Figure 10:
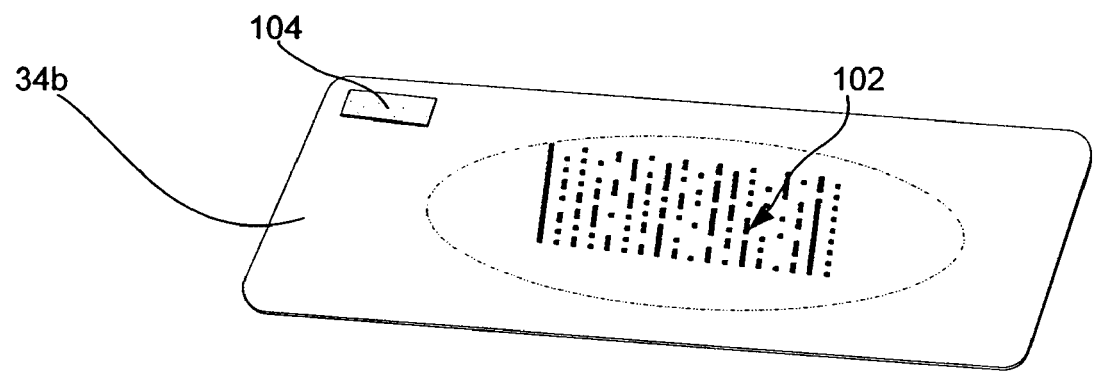
FIG. 10 is a schematic diagram of yet another calibration card that, in addition to including a 2D code, includes an RF memory/transmitter device.
Figure 11:
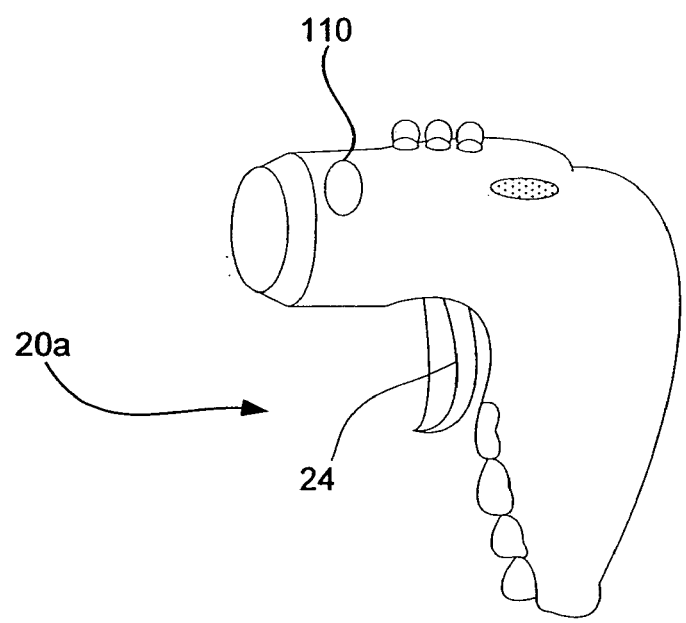
FIG. 11 is a schematic diagram of a handheld verifier similar to the one illustrated in FIG. 2, albeit including an RF antenna to facilitate communication with the RF device shown in FIG. 10.

Consistent with the above comments, referring to FIG. 9, an exemplary calibration card 34b is illustrated that includes a 2D calibration mark 102 as well as an RF memory/transmitter device 104. Referring also to FIG. 10, an exemplary handheld verifier assembly 20a is shown that includes components that are similar to the components described above with respect to FIG. 2. In the interest of simplifying this explanation, the components of assembly 20a that are similar to the components described above with respect to FIG. 2 are not described again here in detail. The main difference between assembly 20a and assembly 20 is that assembly 20a includes, in addition to a camera (not labeled in FIG. 10), an RF antenna 110 for exciting device 104 on card 34b and for receiving information transmitted by device 104.

Here, when trigger member 24 is activated, the camera associated with assembly 20a is used to obtain an image of 2D mark 102. In addition, either prior to the camera obtaining the image or in parallel therewith, RF antenna 110 generates a field that excites device 104 causing device 104 to transmit RF data which is received by antenna 110 and which is provided to the assembly 20a (not illustrated in FIG. 10). The processor uses the information in the obtained image and/or in the data received by antenna 110 to determine whether or not a calibration procedure should be preformed and then to use calibration target parameters to start the process. Here, the calibration start command and calibration target parameters may all be specified in the information received by antenna 110 or only a subset thereof may be included in the information received by antenna 110. Other types of data transmitting storage devices are contemplated.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. For example, instead of providing a calibration start command in the code, in at least some embodiments a verifier may be programmed to decode information and recognize calibration target parameters and to commence a calibration process when the target parameters are recognized.

Furthermore, while the examples above describe systems where images are collected upon a trigger type activity, in at least some cases a hand held or stationary mounted verifier may continually collect images in a repetitive fashion. Here, each time an image is obtained the processor may be programmed to attempt to identify a calibration command in the decoded image information.

Thus, the invention is to cover all modifications, equivalents, and alternatives falling within the spirit and scope of the invention as defined by the following appended claims.

To apprise the public of the scope of this invention, the following claims are made:

What is claimed is:

1. A method for calibrating a mark quality verifier assembly wherein the assembly includes a camera including a camera field of view (FOV) and a processor for running software programs that are stored in a memory that is accessible to the processor, the method comprising the steps of:
   providing a calibration program in the memory that is accessible by the processor;
   providing a calibration code on a surface of a calibration tool wherein the calibration code includes calibration information target parameters;
   positioning the calibration tool adjacent the camera so that the calibration code is within the FOV;
   obtaining at least one image of the calibration code via the camera;
   decoding the calibration code to generate a decoded code;
   examining the decoded code to identify the calibration target parameters;
   using information in the decoded code to determine that a verifier calibration process should be performed;
   commencing the calibration program when the calibration code indicates that a calibration process should be performed; and
   using the calibration target parameters to set at least a subset of verifier parameters for use during subsequent calibration program steps.

2. The method of claim 1 wherein the step of providing a calibration code includes providing a code that includes a start calibration command, the step of examining including identifying the start calibration command in the decoded code.

3. The method of claim 1 wherein the step commencing a calibration program includes commencing the calibration program using the calibration target parameters.

4. The method of claim 3 wherein the step of performing a calibration program includes setting the calibration target parameters in the verifier system and cycling through a calibration process program to generate additional calibration parameters for subsequent use by the verifier.

5. The method of claim 4 wherein the verifier system also includes at least first and second different lighting assemblies for differently lighting the camera FOV, the step of cycling through a calibration program including obtaining at least first and second different images of the calibration code using the first and second different lighting subassemblies.

6. The method of claim 1 further including the steps of, after examining the decoded code, recognizing that the decoded code includes a code other than the calibration code and performing a verification process on the decoded code.

7. The method of claim 1 wherein the verifier further includes a trigger member wherein the step of obtaining at least one image includes activating the trigger member.

8. The method of claim 1 wherein the verification system includes one of a hand held device that includes the processor and the camera and a stationary apparatus that includes a stationary camera.

9. The method of claim 3 wherein the calibration parameters include at least a subset of background surface reflectance and code dimensions.

10. The method of claim 1 wherein the step of providing a calibration code on a calibration tool includes providing a calibration code on a calibration card.

11. The method of claim 1 wherein the step of providing a calibration code includes providing a two dimensional calibration code.

12. The method of claim 1 further including the step of providing the verification assembly in the form of a hand held device.

13. The method of claim 1 further including the step of providing the verification assembly in the form of a stationary mounted device.

14. A method for calibrating a mark quality verifier assembly wherein the assembly includes a camera including a camera field of view (FOV) and a processor for running software programs that are stored in a memory that is accessible to the processor, the method comprising the steps of:
   providing a calibration program in the memory that is accessible by the processor;
   providing a calibration code on a surface of a calibration tool wherein the calibration code encodes a calibration start command and calibration target parameters;
   positioning the calibration tool adjacent the camera so that the calibration code is within the FOV;
   obtaining at least one image of the calibration code via the camera;
   decoding the calibration code in the image to generate a decoded code;
   examining the decoded code for the calibration start command;
   when a calibration start command is identified, commencing the calibration program using the calibration target parameters; and
   when a calibration start command is not identified in the decoded code, commencing a verification process with currently set calibration parameters.

15. The method of claim 14 wherein the verifier further includes a trigger member wherein the step of obtaining at least one image includes activating the trigger member.

16. The method of claim 14 wherein the verification system includes one of a hand held device that includes the processor and the camera and a stationary apparatus that includes a stationary camera.

17. The method of claim 16 wherein the calibration parameters include at least a subset of background surface reflectance and code dimensions.

18. The method of claim 14 wherein the step of providing a calibration code on a calibration tool includes providing a calibration code on a calibration card.

19. The method of claim 14 wherein the step of providing a calibration code includes providing a two dimensional calibration code.

20. A method for calibrating a mark quality verifier assembly wherein the assembly includes a sensor assembly and a processor for running software programs that are stored in a memory that is accessible to the processor, the method comprising the steps of:

providing a calibration program in the memory that is accessible by the processor;

providing a calibration code including at least one two dimensional (2D) code on a surface of a calibration tool wherein the calibration code encodes calibration information and includes calibration target parameters;

positioning the calibration tool adjacent the sensor assembly;

obtaining the calibration code via the sensor assembly;

decoding the calibration code to generate a decoded code;

examining the decoded code for calibration information; and when calibration information is identified, using the calibration target parameters to set at least a subset of verifier parameters for use during subsequent calibration program steps.

21. The method of claim 20 wherein the step of providing a calibration code including calibration information includes providing a calibration code that includes a calibration start command, the step of examining the decoded code including identifying the start calibration command.

22. The method of claim 20 wherein the sensor assembly includes a camera and a data receiver, the step of providing a calibration code includes, in addition to providing the at least one two dimensional (2D) code on the surface of a calibration tool, providing a data storage device for transmitting at least a portion of the calibration code to the receiver, the step of positioning the calibration tool adjacent the sensor assembly including positioning the 2D code in the field of view (FOV) of the camera and the data storage device proximate the receiver, the step of obtaining the calibration code including the steps of obtaining the 2D code via the camera and the portion of the calibration code stored in the data storage device via the camera and the receiver, respectively and the step of decoding the calibration code including decoding at least a subset of the received data from the data storage device and the 2D code.

23. The method of claim 20 wherein the step of providing a data storage device includes providing an RF memory/transmitter device.

24. The method of claim 20 further including the step of providing the verification assembly in the form of a hand held device.

25. The method of claim 20 further including the step of providing the verification assembly in the form of a stationary mounted device.

26. A processor associated with a verification assembly that executes the following set of computer executable instructions stored therein:

decoding a code read from a calibration tool;

determining if the decoded code includes a calibration command;

when the decoded code includes a calibration command:
(i) identifying calibration parameters in the decoded code; and
(ii) commencing a calibration process using the calibration parameters to set at least a subset of verifier parameters for use during subsequent calibration program steps.

27. A mark quality verification system comprising:

a calibration tool including a calibration code on a surface of the calibration tool wherein the calibration code includes calibration information;

a verification assembly comprising:
a camera including a camera field of view (FOV);
a memory storing a calibration program;
a processor linked to the memory and running the calibration program to perform the acts of, with the calibration code within the camera FOV:
(a) obtaining at least one image of the calibration code via the camera;
(b) using information in the calibration code to determine that a verifier calibration process should be performed; and
(c) identifying calibration target parameters in the calibration code; and
(d) commencing the calibration program when the calibration code indicates that a calibration process should be performed and using the calibration target parameters to set at least a subset of verifier parameters for use during subsequent calibration program steps.

28. A method for calibrating a mark quality verifier assembly wherein the assembly includes a camera including a camera field of view (FOV) and a processor for running software programs that are stored in a memory that is accessible to the processor, the method comprising the steps of:

providing a calibration program in the memory that is accessible by the processor;

providing a calibration code on a surface of a calibration tool wherein the calibration code includes calibration target parameters;

positioning the calibration tool adjacent the camera so that the calibration code is within the FOV;

obtaining at least one image of the calibration code via the camera;

using information in the calibration code to determine that a verifier calibration process should be performed; and commencing the calibration program when the calibration code indicates that a calibration process should be performed and using the calibration target parameters.

29. A method for calibrating a mark quality verifier assembly wherein the assembly includes a camera including a camera field of view (FOV) and a processor for running software programs that are stored in a memory that is accessible to the processor, the method comprising the steps of:

providing a calibration program in the memory that is accessible by the processor;

providing a code on a surface of an object;

positioning the object adjacent the camera so that the code is within the FOV;

obtaining at least one image of the code via the camera;

decoding the code in the image to generate a decoded code;

examining the decoded code for a calibration start command;

when a calibration start command is identified, commencing the calibration program using calibration target parameters; and when a calibration start command is not identified in the decoded code, commencing a verification process with currently set calibration parameters.

* * * * *